(12) United States Patent
Palladino

(10) Patent No.: US 8,967,086 B2
(45) Date of Patent: Mar. 3, 2015

(54) UNITARY ANIMAL LEASH AND COLLAR

(71) Applicant: Tyre Palladino, Avoca, NY (US)

(72) Inventor: Tyre Palladino, Avoca, NY (US)

(*) Notice: Subject to any disclaimer, the term of this patent is extended or adjusted under 35 U.S.C. 154(b) by 64 days.

(21) Appl. No.: 13/921,798

(22) Filed: Jun. 19, 2013

(65) Prior Publication Data

US 2013/0340687 A1 Dec. 26, 2013

Related U.S. Application Data

(60) Provisional application No. 61/662,715, filed on Jun. 21, 2012.

(51) Int. Cl.
*A01K 27/00* (2006.01)

(52) U.S. Cl.
CPC ............. *A01K 27/001* (2013.01); *A01K 27/003* (2013.01); *A01K 27/008* (2013.01); *A01K 27/00* (2013.01)
USPC .......................................... 119/793; 119/797

(58) Field of Classification Search
CPC . A01K 27/001; A01K 27/003; A01K 27/002; A01K 27/004; A01K 27/005
USPC .......... 119/792, 793, 795, 797, 798; D30/153
See application file for complete search history.

(56) References Cited

U.S. PATENT DOCUMENTS

| | | | |
|---|---|---|---|
| 2,289,802 A | 7/1942 | Norton | |
| 4,174,793 A * | 11/1979 | Wisowaty | 224/240 |
| 4,584,967 A | 4/1986 | Taplin | |
| 4,787,340 A | 11/1988 | Kirtley | |
| D323,585 S * | 2/1992 | Rader et al. | D3/221 |
| 5,233,942 A * | 8/1993 | Cooper et al. | 119/792 |
| 5,497,733 A | 3/1996 | Hull et al. | |
| 5,947,062 A * | 9/1999 | Hoffman et al. | 119/769 |
| 7,281,495 B2 | 10/2007 | Wagner | |
| 8,322,311 B2 * | 12/2012 | Gould et al. | 119/798 |
| 8,505,495 B2 * | 8/2013 | Wang | 119/797 |
| D690,475 S * | 9/2013 | Chapin | D30/153 |
| D699,405 S * | 2/2014 | McKinnell | D30/153 |
| 2006/0102103 A1 * | 5/2006 | Fountoulakis et al. | 119/795 |
| 2010/0288207 A1 * | 11/2010 | Hollenbeck et al. | 119/797 |

* cited by examiner

*Primary Examiner* — Yvonne Abbott

(74) *Attorney, Agent, or Firm* — Tracy Jong Law Firm; Tracy P. Jong; Cheng Ning Jong

(57) ABSTRACT

A unitary animal leash and collar comprising a strap having a grasping loop formed by affixing one end of the strap on a portion of the strap and strategically disposing hook and loop portions on the opposing surfaces of the strap where a collar can be sized and formed by mating a hook portion with a loop portion. A band keeper comprises two ends where one end is slidably secured to the strap and hook and loop portions disposed on opposing surfaces of the band keeper. Upon forming a collar around an animal's neck, the band keeper is positioned adjacent a portion of the strap where hook and loop portions of the strap have been mated and the band keeper is wrapped around the strap such that a hook portion of the band keeper is mated with a loop portion of the band keeper.

15 Claims, 7 Drawing Sheets

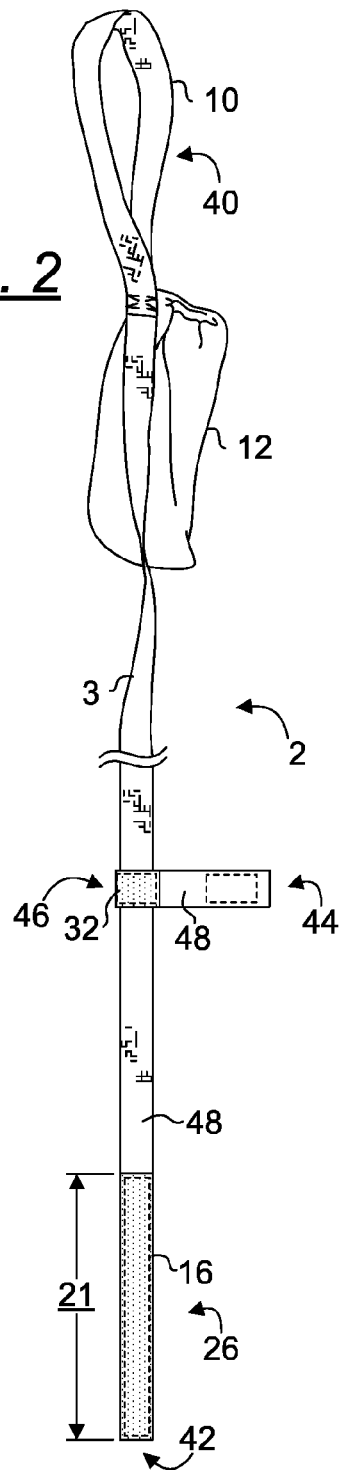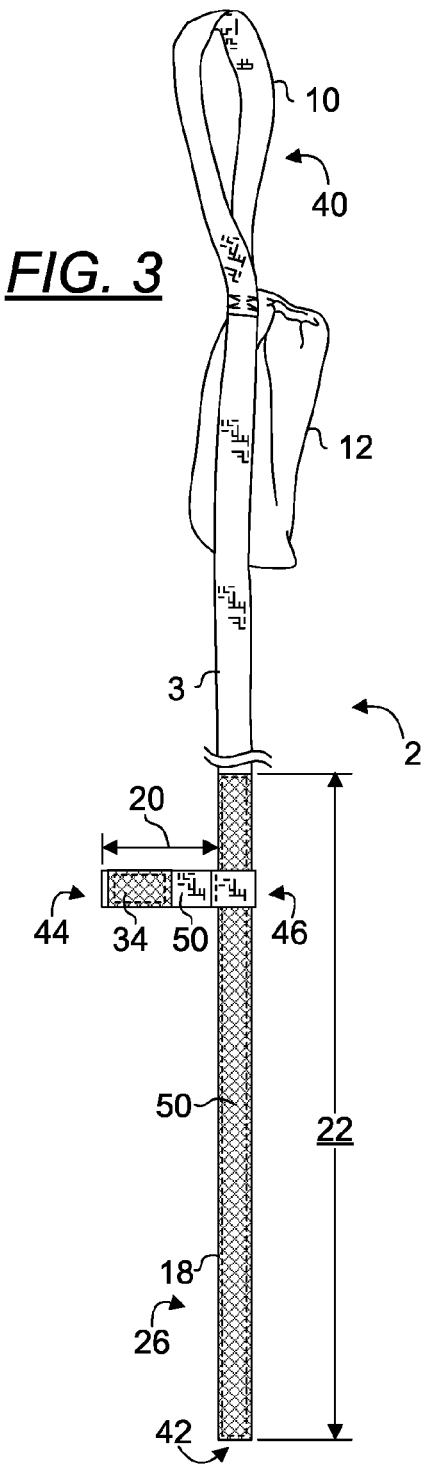

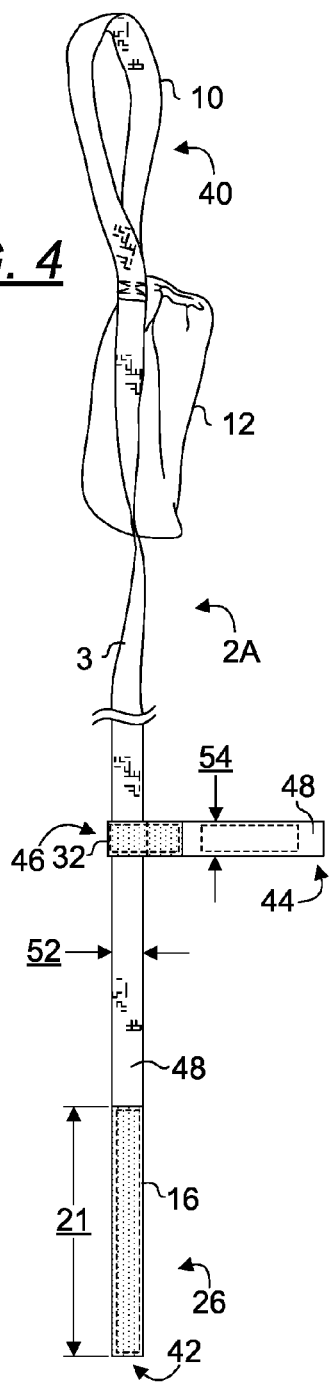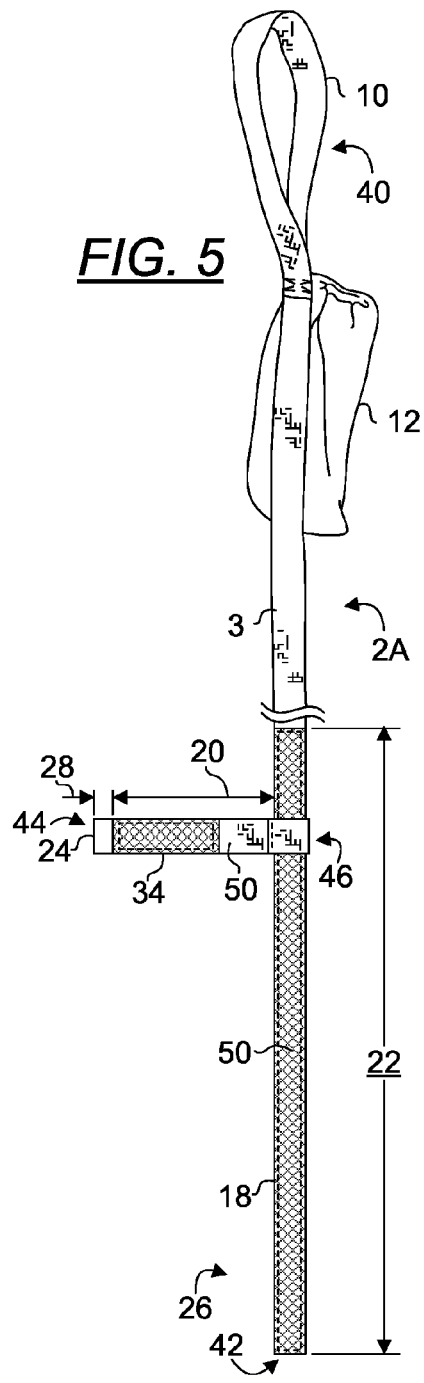

UNITARY ANIMAL LEASH AND COLLAR

PRIORITY CLAIM AND RELATED APPLICATIONS

This non-provisional application claims priority to provisional application U.S. Ser. No. 61/662,715 filed Jun. 21, 2012. Said application is incorporated by reference herein in its entirety.

BACKGROUND OF THE INVENTION

1. The Field of the Invention

The present invention is directed generally to an animal restraint, and more particularly, to a unitary animal leash and collar that can be assembled and disassembled with ease.

2. Background Art

Several attempts have previously been made to combine an animal collar with a leash to provide convenience to the pet owner. Various materials including a cord, a strap, and webbing material have been attempted.

U.S. Pat. No. 2,289,802 to Norton (hereinafter Norton) discloses a lead for animals and cats or the like comprising a single length of cord, a rigid loop of metal slidably confining a fold of the cord, and means securing one end of the cord about a stretch of the fold, whereby the length of cord between the end and the loop forms a collar of adjustable size and the length of cord beyond the loop provides a leash. The simplicity and manner in which a collar is formed and the manner in which the collar is secured are similar to those of the present invention. Several major differences lie in: (1) the material used in the leash/collar, i.e., a cord in Norton as compared to a band or strap in the present invention; and (2) the manner in which the collar is put on a animal, i.e., via looping through the animal's head in Norton as compared to forming the collar at the neck region in the present invention.

U.S. Pat. No. 7,281,495 to Wagner (hereinafter Wagner) discloses a combination pet collar and leash including a leash that is attached to the collar and is fastened about the collar when not in use. When fastened about the collar, the leash conforms to the collar around the neck of a pet. When unfastened from the collar, the leash extends to a length to provide comfortable separation distance between a person holding the leash and the pet wearing the collar while allowing for appropriate control of the pet. The major difference between this disclosure and the present invention lies in the manner in which the collar is formed. Wagner discloses a collar constructed from a conventional belt buckle type device including a buckle, a buckle prong, a plurality of prong holes and a leash, etc, thereby requiring an increased amount of effort and time when installing and releasing the device from a pet. As the leash portion is attached to the collar while not in use, additional weight must now be carried around the neck by the pet, which may be annoying to the pet.

U.S. Pat. No. 4,584,967 to Taplin (hereinafter Taplin) discloses a collar/leash combination for pets wherein a flexible member with a buckle attached to one end so that a collar can be formed by inserting the other end of the member through the buckle. Hooks and loops are used to keep the leash section of the member wound around the pet's collar when the leash is not in use. A grasping loop is formed at the other end of the flexible member. An alternate embodiment uses a pouch to keep the leash in place, attached to the pet's collar. Taplin discloses a collar secured using a buckle in contrast to a hook and loop equipped band keeper of the present invention for maintaining the formed collar in place, thereby requiring an increased amount of effort and time when installing and releasing the device from a pet. In Taplin, long expanses of hook and loop portions are required of this configuration as the collar portion of the leash/collar is formed of a strap that is folded upon itself and attached with cooperating hook and loop portions disposed on the outer and inner surfaces of the leash/collar.

U.S. Pat. No. 4,787,340 to Kirtley discloses an animal collar and leash set where the collar and leash are available in two separate pieces. This disclosure teaches using hook and loop portions to form a collar and does not contemplate using a band keeper to prevent accidental detachment of the hook and loop portions and the use of a single strap to form a collar and a leash. The lack of a band keeper prevents effective storage of the leash and collar portions while not in use in a compact manner.

U.S. Pat. No. 5,497,733 to Hull et al. discloses a combination animal choke collar and leash which includes an elongated, continuous member having a grasping portion on one of its ends, its opposite end being folded upon itself and fastened so as to form a loop which captures a rectangular frame. The handle portion when drawn through the rectangular frame forms a loop which is used as a choke collar and provides a second position. A first position is provided when the choke collar is in place around the animal's neck, and the leash portion of the member is wrapped around upon itself and held secure by a loop and pile fastener such as VELCRO™. This device can be worn by the animal at all times when in its first position and when a person desires control over the animal they simply give a gentle tug on the grasping portion and the device assumes its second position. Also included is a pocket which receives and protects valuable documents such as identification papers pertaining to the animal. Although there appears to be a configuration where a collar can be formed by mating a hook portion to a loop portion, this position does not result in a usable leash. It appears that the configuration that can be used as a combined leash and collar can only be used as a choke collar.

None of these patents suggest the novel features of the present invention. Thus, there exists a need for a unitary animal leash and collar which can be formed and dismantled easily, does not require putting the collar through the head of an animal and simple and economical to fabricate.

SUMMARY OF THE INVENTION

The present invention discloses a unitary animal leash and collar (or device) comprising:
  (a) a main strap having an inner surface, an outer surface, a first end, a second end, a first attachment portion disposed on the outer surface of the second end and a second attachment portion disposed on the inner surface of the second end and a grasping loop disposed on the first end; and
  (b) a secondary strap having an inner surface, an outer surface, a third end, a fourth end, a third attachment portion disposed on the outer surface of the third end, a fourth attachment portion disposed on the outer surface of the fourth end and a securing loop disposed on the fourth end, wherein the secondary strap is led through the securing loop such that the secondary strap is slideably attached to a portion of the main strap;

wherein the second end is curled such that the first attachment portion is configured for removable attachment with the second attachment portion to form a stacked second end and the secondary strap is wrapped around a portion of the stacked second end such that the third attachment is configured for removable attachment with the fourth attachment portion.

In one embodiment, the device further comprises a storage pouch that is fixedly attached to said main strap and for receiving the main strap and the secondary strap for neat and compact storage within the pouch while the device is not in use.

In one embodiment, the device further comprises a ring fixedly secured to the main strap, where the ring is configured for convenient attachment of peripheral items such as an animal identification tag, keys and the like.

In one aspect, the secondary strap is configured as a stowage securing strap. The main strap is first arranged in a compact manner to form a bundle before the secondary strap is wrapped around the bundle such that the first attachment portion of the secondary strap is configured for removable attachment with the second attachment portion of the secondary strap. The secondary strap therefore serves dual purposes, i.e., to maintain the formed collar of the main strap and to compactly store the device.

In one embodiment, at least one of the main strap and the secondary strap are constructed from a water resistant material such as nylon and polyester.

In one embodiment, the device further comprises a tab portion configured to extend from the third end of the secondary strap where the tab portion is appropriately sized and positioned as hand grip to ease detachment of the third attachment portion from the fourth attachment portion.

It is a primary object of the present invention to provide a device where the collar is deployable and dismantable in relatively few and simple steps, thereby enabling speedy deployment when the collar is needed and speedy dismantlement when the collar is no longer needed.

It is another object of the present invention to provide a device that is deployable without bringing the collar through the head of an animal.

It is yet another object of the present invention to provide a device that is inexpensive to manufacture.

It is a further object of the present invention to provide a device that includes few parts and easy to use.

Whereas there may be many embodiments of the present invention, each embodiment may meet one or more of the foregoing recited objects in any combination. It is not intended that each embodiment will necessarily meet each objective. Thus, having broadly outlined the more important features of the present invention in order that the detailed description thereof may be better understood, and that the present contribution to the art may be better appreciated, there are, of course, additional features of the present invention that will be described herein and will form a part of the subject matter of this specification.

In this respect, before explaining at least one embodiment of the invention in detail, it is to be understood that the invention is not limited in its application to the details of construction and the arrangements of the components set forth in the following description or illustrated in the drawings. The present invention is capable of other embodiments and of being practiced and carried out in various ways. Also it is to be understood that the phraseology and terminology employed herein are for the purpose of description and should not be regarded as limiting.

BRIEF DESCRIPTION OF THE DRAWINGS

In order that the manner in which the above-recited and other advantages and objects of the invention are obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which:

FIGS. 2 and 3 are front perspective views of a unitary animal leash and collar according to one embodiment of the present invention, depicting an orthogonally disposed outer and inner portion, respectively of the collar portion.

FIGS. 4 and 5 are front perspective views of a unitary animal leash and collar according to another embodiment of the present invention, depicting an orthogonally disposed outer and inner portion, respectively of the collar portion.

PARTS LIST

2—unitary leash and collar device
3—main strap
4—collar
6—leash
8—band keeper or secondary strap
10—grasping loop
12—storage pouch
14—ring
16—first attachment portion or hook portion
18—second attachment portion or loop portion
20—length of band keeper
21—length of first attachment portion
22—length of second attachment portion
24—tab portion
26—collar portion
28—length of tab portion
30—securing loop
32—third attachment portion or hook portion of band keeper
34—fourth attachment portion or loop portion of band keeper
36—direction
37—direction
38—bundle
40—first end
42—second end
44—third end
46—fourth end
48—outer surface
50—inner surface
52—width of main strap
54—width of band keeper

PARTICULAR ADVANTAGES OF THE INVENTION

The present device provides a collar that is deployable and dismantable without being required to be slipped over the head of an animal. The ease with which a collar is formed, maintained and dismantled is unmatched by any prior art. The ease with which the collar is fabricated is also unmatched by any prior art. In order for a collar and a leash to be formed, two straps, i.e., a main strap and a secondary strap, are provided, with the secondary strap configured to be slideably attached to the main strap and hook and loop attachment portions of appropriate types placed on appropriate positions of the straps.

In one embodiment, the device is stowable by simply using one of the two existing straps, therefore not requiring an additional dedicated part for stowage. While not in use, all removable attachments of the secondary strap and the main strap are simply removed such that the collar can be dismantled. The main strap is then rolled into a bundle or zigzag folded longitudinally into a bundle such that the secondary strap can be wrapped around the bundle and attached to itself to secure the bundle. In order to release or unfurl the bundle, the attachment made between two attachment portions of the secondary strap is simply removed.

DETAILED DESCRIPTION OF A PREFERRED EMBODIMENT

The term "about" is used herein to mean approximately, roughly, around, or in the region of. When the term "about" is used in conjunction with a numerical range, it modifies that range by extending the boundaries above and below the numerical values set forth. In general, the term "about" is used herein to modify a numerical value above and below the stated value by a variance of 20 percent up or down (higher or lower).

The terms secondary strap may be used interchangeably herein with the terms band keeper as it is used for securing stacked and attached portions of the main strap, thereby preventing the separation of such portions when the first end of the main strap is pulled against the second end of the main strap.

An inner surface, as used herein is generally referred to a surface or an extension of a surface that is not exposed when the device is deployed. An outer surface references an opposite surface of the inner surface.

Figure 1:
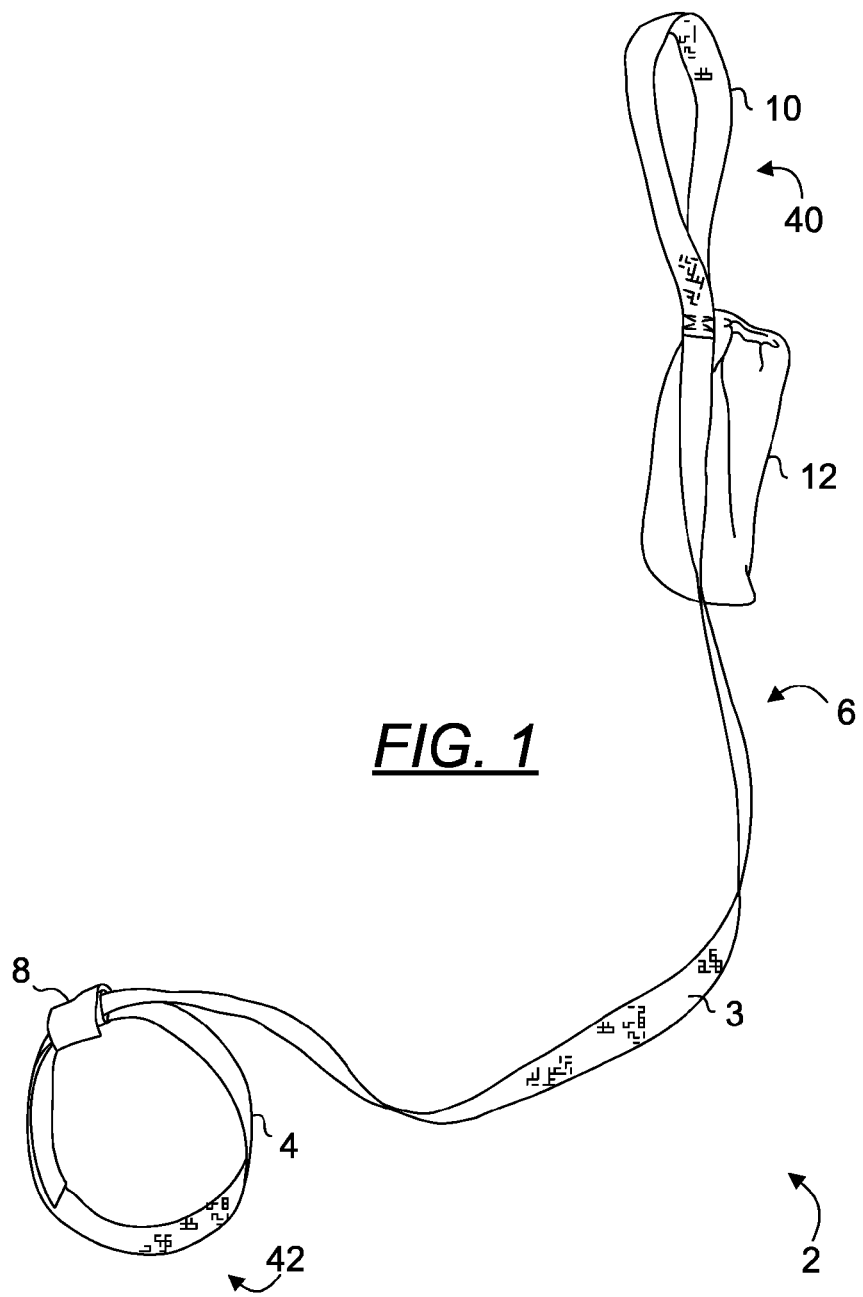
FIG. 1 is a perspective view of a unitary animal leash and collar according to one embodiment of the present invention.

The present invention is a unitary animal leash and collar 2 as shown in FIGS. 1-10. FIG. 1 is a perspective view of a unitary animal leash and collar 2 according to one embodiment of the present invention. The device 2 includes a main strap 3 having a grasping loop 10 formed by affixing, e.g., by stitching, one end 40 of the main strap 3 on a portion of the main strap 3 preferably to form a loop large enough to accommodate a human hand. A leash 6 is thus formed. A collar can be sized and formed on the other end 42 by strategically disposing complementary hook 16 and loop 18 portions on opposing surfaces of the main strap 3 as shown in FIG. 2. A band keeper 8 is provided for maintaining such a formed collar. In this embodiment, a storage pouch 12 is also provided for receiving the main strap 3 and the secondary strap 8 for neat and compact storage within the pouch 12. Additional compactable or small items such as animal waste bags or treats may also be stored in the pouch 12 for convenience. In another embodiment, a grasping loop 10 may be formed of a separately available rigid ring that is fixedly attached to a portion of the main strap 3 at one end 40.

FIGS. 2 and 3 are front perspective views of a unitary animal leash and collar according to one embodiment of the present invention, depicting an orthogonally disposed outer and inner portion, respectively of the collar portion 26. The collar portion 26 includes an inner surface 50 and an outer surface 48 opposingly disposed to the inner surface. The outer surface 48 of the collar portion 26 comprises a first attachment portion 16 having a first length 21 and the inner surface 50 of the collar portion 26 comprises a second attachment portion 18 having a second length 22. The first and second attachment portions 16, 18 of the main strap 3 are disposed substantially parallelly with respect to the main strap 3 such that the widths of the attachment portions 16, 18 are substantially the width of the main strap 3. The band keeper 8 comprises an outer surface, an inner surface opposingly disposed to the outer surface, a third end 44 and a fourth end 46. A third attachment portion 32 is disposed substantially at the fourth end on the inner surface of the secondary strap 8. A fourth attachment portion 34 is disposed substantially at the third end on the outer surface of the band keeper 8.

FIGS. 4 and 5 are front perspective views of a unitary animal leash and collar 2A according to another embodiment of the present invention, depicting an orthogonally disposed outer and inner portion, respectively of the collar portion 26. In this embodiment 2A, the band keeper 8 is configured longer than the embodiment shown in FIGS. 2 and 3. Referring back to FIG. 2, the length of the third attachment portion 32 is substantially the width of the main strap 3. Applicant discovered that such length of the third attachment portion is suitable in securing docile animals. In contrast, the length of the third attachment portion 32 is substantially twice the width of the main strap 3 as shown in FIG. 4. The width 52 of the main strap 3 measures from about 1 inch to 1.5 inches. In another embodiment, the width of the band keeper 8 measures from about 1 inch to 1.5 inches. The fourth attachment portion 34 of FIG. 5 is also longer and substantially twice the length of the version shown in FIG. 3.

In one embodiment configured for dogs, the first 21 and second 22 lengths are preferably about 5 and about 30 inches, respectively. The band keeper 8 including the tab portion 24 preferably measures from about 7 inches to 8 inches in length (sum of 20 and 28). In one embodiment, the width of an attachment portion, e.g., 16, 18, 32, 34 is configured to be substantially the width of the substrate to which it is disposed. The tab portion 24 measures about 0.5 inches in length 28. In one embodiment, the first 16 and second 18 attachment portions and third 32 and fourth 34 attachment portions are preferably constructed from complementary hook and loop portions. Although less preferable, the first and second attachment portions and third and fourth attachment portions may also be constructed from opposing snaps, buttons and button holes and clips.

Figure 6:
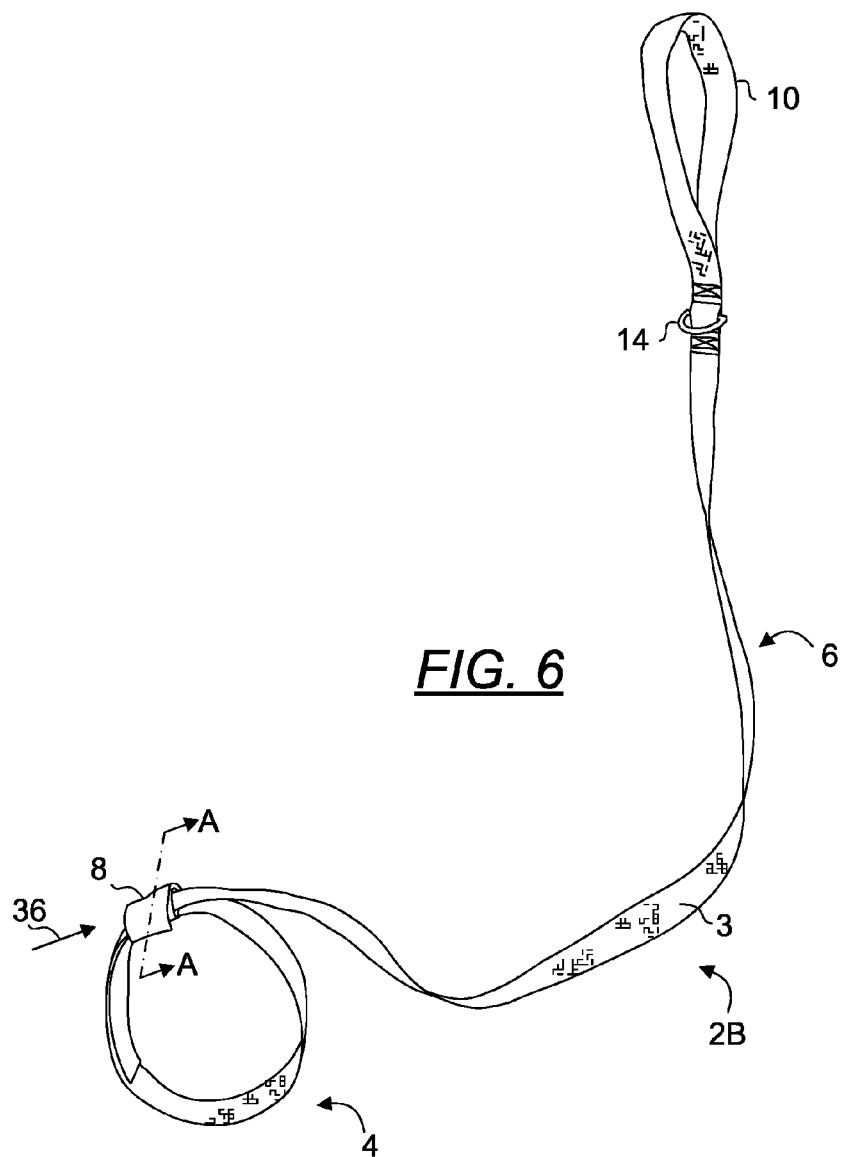
FIG. 6 is a front perspective view of a unitary animal leash and collar according to another embodiment of the present invention, depicting the incorporation of a D ring instead of a storage pouch to the leash portion.

FIG. 6 is a front perspective view of a unitary animal leash and collar 2B according to another embodiment of the present invention, depicting the incorporation of a D ring 14 instead of a storage pouch to the leash portion at a position substantially close to the grasping loop 10. The D ring 14 is configured for convenient attachment of peripheral items such as an animal identification tag, keys, etc. or for convenient attachment to a storage hanger. In yet another embodiment not shown, both a D ring 14 and a storage pouch 12 are made available in one unitary animal leash and collar.

Figure 7:
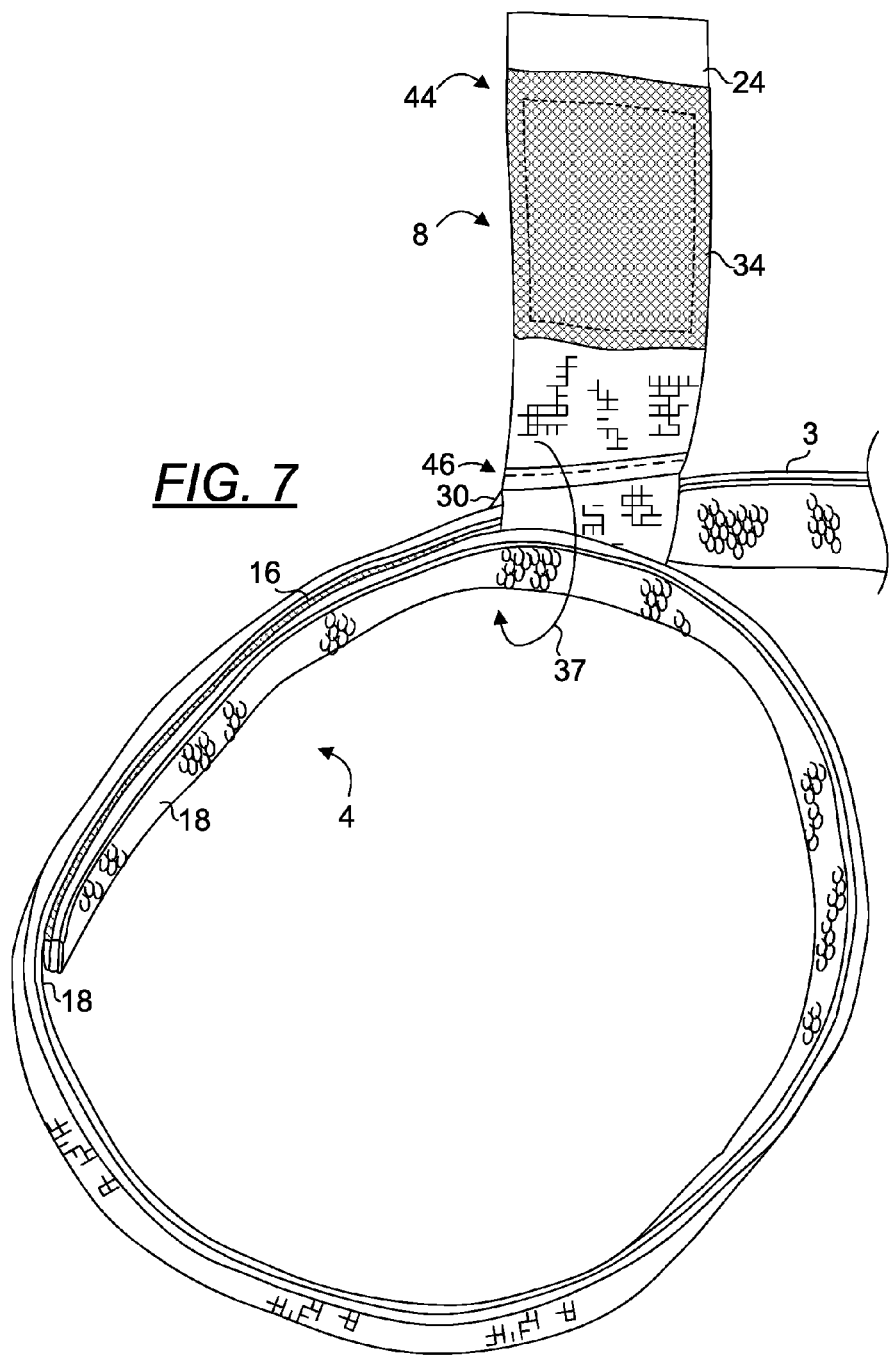
FIG. 7 is a partial perspective view of a band keeper of a unitary animal leash and collar according to one embodiment of the present invention, depicting the placement of the band keeper with respect to the collar portion.
Figure 8:
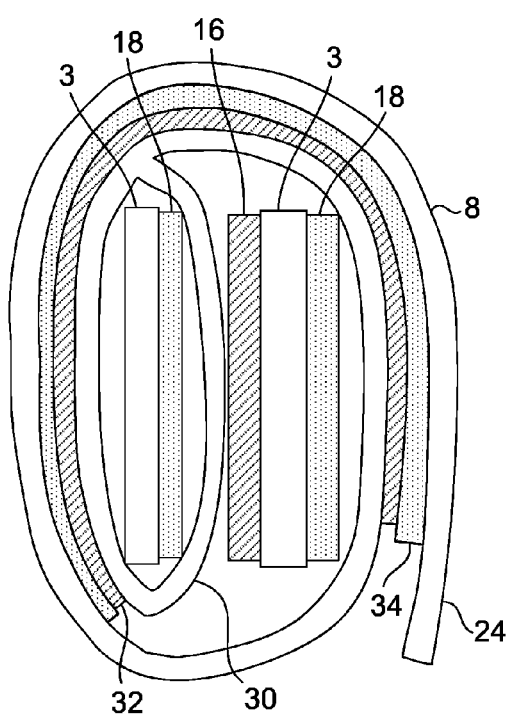
FIG. 8 is a cross-sectional orthogonal view of the unitary animal leash and collar as taken along line A-A of FIG. 6 and viewed from direction 36.

FIG. 7 is a partial perspective view of a band keeper 8 of a unitary animal leash and collar according to one embodiment of the present invention, depicting the placement of the band keeper 8 with respect to the collar portion 4. In use, the second end of the main strap 3 is curled around the neck of an animal such that the first attachment portion 16 faces and can be mated to the second attachment portion 18 to create a collar 4. Upon forming the collar portion 4, the band keeper 8 is slid to the point where the engagement of the first 16 and second 18 attachment portions end before being wrapped around in direction 37 to encompass a portion of the stacked main strap 3 portions such that the third attachment portion 32 of the band keeper 8 is removably mated with the fourth attachment portion 34. The band keeper 8 comprises a third end 44 and a fourth end 46 at which the band keeper 8 is slideably secured to the main strap 3. In one embodiment, such sliding securement is enabled by looping the fourth end 46 of the band keeper 8 around the main strap 3 and onto itself and stitching this end to form a securing loop 30. In another embodiment, the securing loop 30 may also be formed of a separately available rigid ring that is fixedly attached to the band keeper 8 at the fourth end 46 of the band keeper 8. In order to further clarify the use of band keeper 8 to secure the collar 4, FIG. 8 is provided to show a cross-sectional orthogonal view of the unitary animal leash and collar as taken along line A-A of FIG. 6 and viewed from direction 36. It shall be apparent from viewing FIG. 8 that the band keeper 8 is slideably secured to a portion of the main strap 3 at securing loop 30 and the band keeper 8 is wrapped around a stacked portion of the main strap 3 such that the third attachment portion 32 is removably attached to the fourth attachment portion 34 whose length is substantially equal to twice the width of the main strap 3. It shall also be apparent from FIG. 8 that the tab portion 24 causes the band keeper 8 to be offset slightly from itself and thus provides a grasping point for fingers to facilitate disengagement of the third attachment portion 32 from the fourth attachment portion 34.

Figure 9:
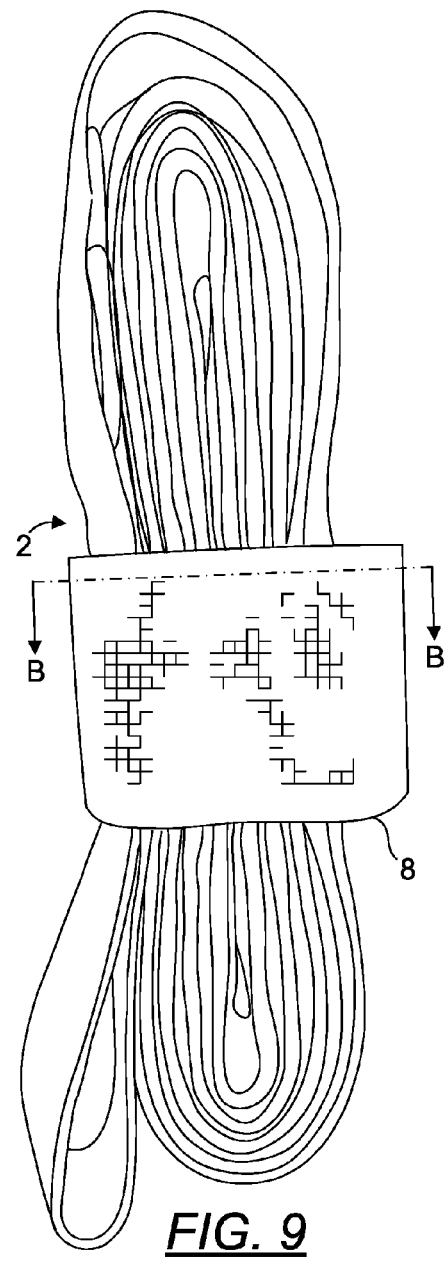
FIG. 9 is a side view of a unitary animal leash and collar, depicting a stored configuration without using a storage pouch.
Figure 10:
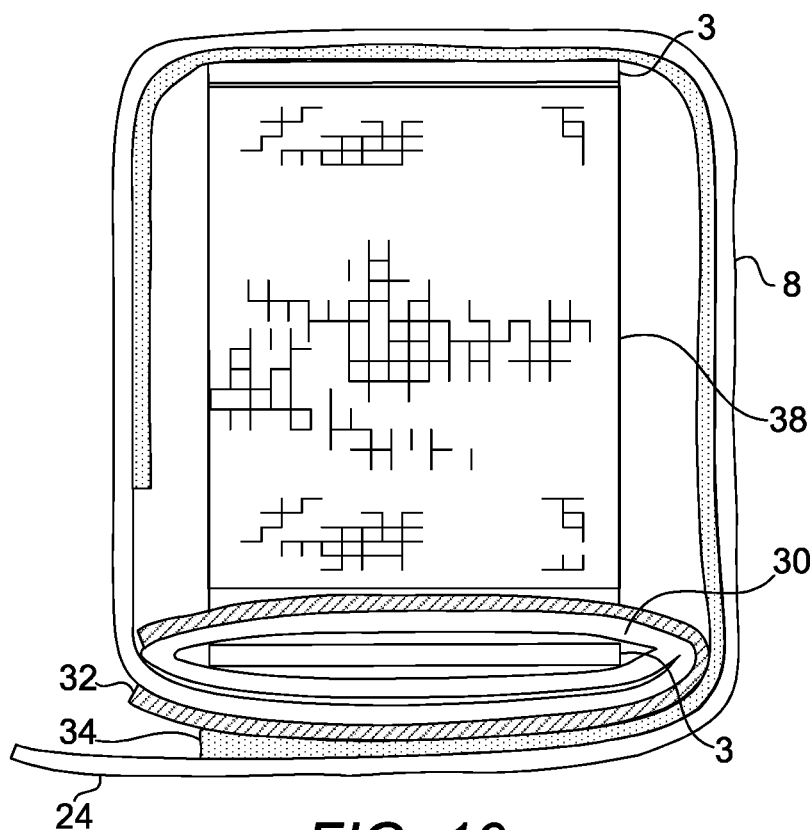
FIG. 10 is a cross-sectional orthogonal view of the unitary animal leash and collar as taken along line B-B of FIG. 9.

FIG. 9 is a side view of a unitary animal leash and collar, depicting a stowed configuration without using a storage pouch. FIG. 10 is a cross-sectional orthogonal view of the unitary animal leash and collar as taken along line B-B of FIG. 9. While not in use, the main strap 3 is either stacked in a zigzag manner or rolled into a bundle such that the band keeper 8 can be wrapped around the bundle until the third attachment portion 32 is disposed in a position ready to be pressed against the fourth attachment portion 34. Referring to FIG. 10, upon creating a bundle 38, the band keeper 8 is immediately folded back at the securing loop 30 such that a surface on which the third attachment portion 32 is disposed, faces away from the bundle 38. The band keeper 8 continues to be wrapped until the fourth attachment portion 34 comes in secure engagement with the third attachment portion 32. Again, in this configuration, the tab portion 24 provides a grasping point for fingers to facilitate disengagement of the third attachment portion 32 from the fourth attachment portion 34.

The main strap 3 and the band keeper 8 are preferably constructed from a durable and water resistant material, such as nylon and polyester.

I claim:

1. A unitary animal leash and collar having a leash portion and a collar portion, said unitary animal leash and collar comprising:
    (a) a main strap having a width, an inner surface, an outer surface, a first end, a second end, a first attachment portion disposed on said outer surface of said second end and a second attachment portion disposed on said inner surface of said second end and a grasping loop disposed on said first end; and
    (b) a secondary strap having an inner surface, an outer surface, a third end, a fourth end, a third attachment portion disposed on said outer surface of said third end, a fourth attachment portion disposed on said outer surface of said fourth end and a securing loop disposed on said fourth end, wherein said main strap is led through said securing loop such that said secondary strap is slideably attached to a portion of said main strap and said third attachment portion having a length;

wherein said leash portion is formed when said second end is curled such that said first attachment portion is configured for removable attachment with said second attachment portion to form a stacked second end and said secondary strap is wrapped around a portion of said stacked second end such that said third attachment portion is configured for removable attachment with said fourth attachment portion.

2. The unitary animal leash and collar of claim 1, further comprising a storage pouch that is fixedly attached to said main strap and adapted to receive said main strap and said secondary strap for storage within said storage pouch.

3. The unitary animal leash and collar of claim 1, further comprising a ring fixedly secured to said main strap, said ring is configured for attachment of peripheral items.

4. The unitary animal leash and collar of claim 1, wherein said main strap is stacked while not in use to form a stack and said secondary strap is configured to wrap around said stack such that said third attachment portion is removably mated with said fourth attachment portion.

5. The unitary animal leash and collar of claim 1, further comprising a tab portion extending from said third end, wherein said tab portion is configured as a finger grip for ease of detachment of said third portion from said fourth attachment portion.

6. The unitary animal leash and collar of claim 1, wherein said length of said third attachment portion is substantially said width of said main strap.

7. The unitary animal leash and collar of claim 1, wherein said length of said third attachment portion is substantially twice said width of said main strap.

8. The unitary animal leash and collar of claim 1, wherein at least one of said main strap and said secondary strap is constructed from a material selected from the group consisting of nylon and polyester.

9. A unitary animal leash and collar having a leash portion and a collar portion, said unitary animal leash and collar comprising:
    (a) a main strap having an inner surface, an outer surface, a first end, a second end, a first attachment portion disposed on said outer surface of said second end and a second attachment portion disposed on said inner surface of said second end and a grasping loop disposed on said first end;
    (b) a secondary strap having an inner surface, an outer surface, a third end, a fourth end, a third attachment portion disposed on said outer surface of said third end, a fourth attachment portion disposed on said outer surface of said fourth end and a securing loop disposed on said fourth end, wherein said main strap is led through said securing loop such that said secondary strap is slideably attached to a portion of said main strap; and
    (c) a tab portion on said third end, wherein said tab portion is configured as a finger grip for ease of detachment of said third attachment portion from said fourth attachment portion, wherein said leash portion is formed when said second end is curled such that said first attachment portion is configured for removable attachment with said second attachment portion to form a stacked second end and said secondary strap is wrapped around a portion of said stacked second end such that said third attachment portion is configured for removable attachment with said fourth attachment portion.

10. The unitary animal leash and collar of claim 9, further comprising a storage pouch that is fixedly attached to said main strap and for receiving said main strap and said secondary strap for storage within said storage pouch.

11. The unitary animal leash and collar of claim 9, further comprising a ring fixedly secured to said main strap, said ring is configured for attachment of peripheral items.

12. The unitary animal leash and collar of claim 9, wherein said main strap is stacked while not in use to form a stack and said secondary strap is configured to wrap around said stack such that said third attachment portion is removably mated with said fourth attachment portion.

13. The unitary animal leash and collar of claim 9, wherein said length of said third attachment portion is substantially said width of said main strap.

14. The unitary animal leash and collar of claim 9, wherein said length of said third attachment portion is substantially twice said width of said main strap.

15. The unitary animal leash and collar of claim 9, wherein at least one of said main strap and said secondary strap is constructed from a material selected from the group consisting of nylon and polyester.

\* \* \* \* \*